(No Model.)
B. W. KILBURN.
PHOTOGRAPHIC CAMERA.
No. 286,447. Patented Oct. 9, 1883.
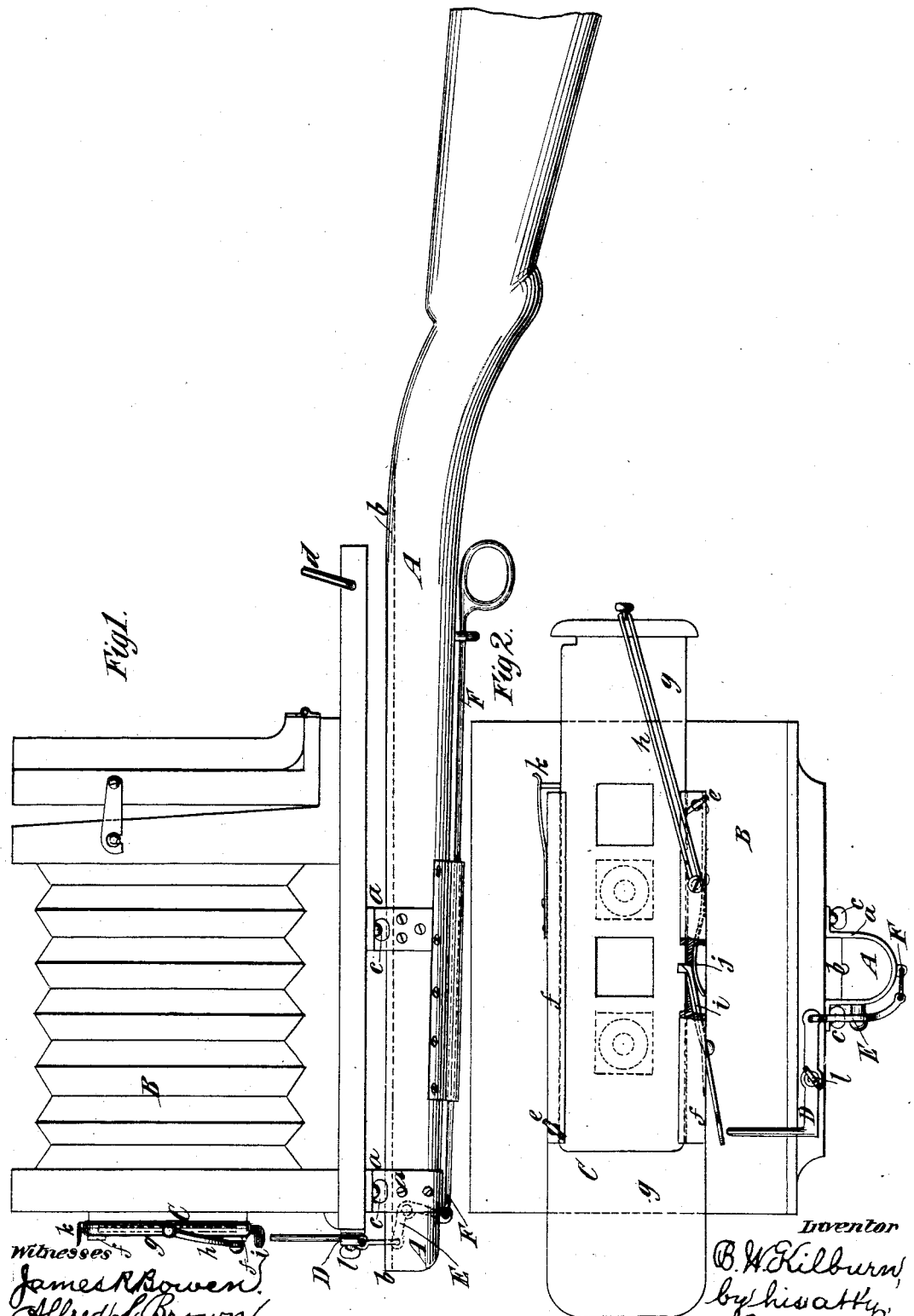
Witnesses
James R Bowen
Alfred L Brown
Inventor
B. W. Kilburn
by his atty
Edwin H Brown

UNITED STATES PATENT OFFICE.

BENJAMIN W. KILBURN, OF LITTLETON, N. H., ASSIGNOR TO THE SCOVILL MANUFACTURING COMPANY, OF WATERBURY, CONN.

PHOTOGRAPHIC CAMERA.

SPECIFICATION forming part of Letters Patent No. 286,447, dated October 9, 1883.

Application filed March 30, 1883. (No model.)

*To all whom it may concern:*

Be it known that I, BENJAMIN W. KILBURN, of Littleton, in the county of Grafton and State of New Hampshire, have invented a certain new and useful Improvement in Photographic Cameras, of which the following is a specification.

This improvement relates particularly to photographic cameras which are employed for taking what are termed "instantaneous" pictures.

The principal object of the improvement is to provide a convenient support for such a camera.

In the accompanying drawings, Figure 1 is a side view of a camera and support embodying my improvement, and Fig. 2 is a front view of the same.

Similar letters of reference designate corresponding parts in both figures.

A designates the support for the camera. It may be made of wood or other suitably strong and light material, and is shaped like a gun, so as to have a stock-like portion, which may be held in the hands, a shoulder-piece to be placed against the shoulder, and a barrel-like portion on which the camera B is mounted. The camera is so arranged that a photographic plate contained in it will stand approximately at right angles to the length of the support.

The camera B may be of any suitable construction. It is mounted on standards $a$ some distance above the barrel-like portion of the support A, so as to leave a clear unobstructed space between it and said support. The support, as here shown, is provided with a sight, $b$, which is formed by grooving it longitudinally. Preferably it will be detachably connected to the standards $a$, so that it can be removed from the support A and used upon an ordinary stand when desirable. I have shown it as connected to the standards by thumb-screws $c$; but any other means which will provide for quickly and conveniently connecting it from and reconnecting it to the standards may be employed.

As here shown, the camera has a hinged ground-glass frame, and near the rear end of its base-piece is a support, $d$, on which the ground-glass frame may rest when swung back. This support will hold the ground glass sufficiently high to prevent it from obstructing the space between the camera and its support A. The camera is shown as provided with a fly-shutter, C, which preferably will be detachably secured in place by thumb-screws $e$, or other suitable means, so that it may be detached and replaced by one of another kind when the camera is to be used on another support than the support A for taking pictures with long exposures. The shutter shown is designed for taking stereoscopic pictures, and has guides $f$, in which work a slide, $g$. The fly of this slide is effected by a spring, $h$, here shown as consisting of an india-rubber band. A catch, $i$, consisting of a lever having at one end a tooth adapted to engage with a notch in the adjacent edge of the slide, holds the slide in position until it is desirable to make an exposure of the photographic plate. A spring, $j$, holds the lever in position to engage with the notch in the adjacent edge of the slide, and causes it to engage with the said notch when the latter is brought opposite its tooth. A spring-detent, $k$, having a tooth which is adapted to engage with a notch in the adjacent edge of the slide, will prevent the rebound of the shutter after its fly, thus obviating a second exposure.

D designates a lever pivoted, preferably, by a thumb-screw, $l$, to the lower part of the camera, and adapted at one end to impinge against the catch-lever $i$ and cause it to release the slide. The other end of the said lever D is connected to one end of a bell-crank lever, E, which is pivoted to the support A. At the other end the bell-crank lever E has connected to it a rod, wire, cord, or analogous device, F, which extends along the support A to a position where, in a gun, the trigger is located. At the rear end this device F has a loop, in which a finger may be inserted to pull it. By pulling the device F the lever E will be shifted and the latter will in turn shift the lever D, so as to cause it to release the catch-lever $i$ from the slide $g$. The spring $h$ will thereupon effect the fly of this slide. The rod or device F is shown as extending along the under side of the support A, and as working through a guide-piece, G.

It is obvious that after the camera is fixed for taking a picture the support A may be held like a gun, the object to be photographed may be sighted, and the fly of the shutter-slide can be effected so as to take a desired picture both conveniently and quickly.

What I claim as my invention, and desire to secure by Letters Patent, is—

1. In an apparatus for taking instantaneous photographs, the combination of a photographic camera and a support therefor having the form of a gun, and provided with a shoulder-piece, the camera being mounted on the support in such a position that a photographic plate placed in it will be approximately at right angles to the length of the support, substantially as specified.

2. In an apparatus for taking instantaneous photographs, the combination of a photographic camera and a support therefor having the form of a gun, the camera being so arranged upon the support that a photographic plate placed in it will be approximately at right angles to the length of the support, and being detachably connected with the support, so that it can be removed and used on a different support, substantially as specified.

3. In an apparatus for taking instantaneous photographs, the combination of a photographic camera and a support therefor having the form of a gun, the camera being mounted above the support in such position that a photographic plate placed in it will be approximately at right angles to the length of the support, and the camera being elevated sufficiently to leave between it and the support an unobstructed passage, affording provision for sighting along the barrel-like portion of the support, substantially as specified.

4. In an apparatus for taking instantaneous photographs, the combination, with a photographic camera provided with a fly-shutter, of a support having the form of a gun, on which the camera is mounted in such position that a photographic plate placed in it will be approximately at right angles to the length of the support, the said support being provided with a shoulder-piece, and means connected to the shutter and extending along the support nearly to the shoulder-piece, so that they may be actuated to effect the release of the shutter, substantially as specified.

BENJAMIN W. KILBURN.

Witnesses:
WM. JACKSON, Jr.,
L. T. NINDE.